US005288805A

United States Patent [19]

Kodali

[11] Patent Number: 5,288,805

[45] Date of Patent: Feb. 22, 1994

[54] LINSEED OIL BASED POLYMERIC VEHICLE

[75] Inventor: Dharma R. Kodali, Minnetonka, Minn.

[73] Assignee: Cargill, Incorporated, Minneapolis, Minn.

[21] Appl. No.: 929,815

[22] Filed: Aug. 14, 1992

[51] Int. Cl.[5] .......................... C08F 36/00; C08F 8/30

[52] U.S. Cl. .................................... 525/190; 526/283; 525/123; 525/185; 525/554

[58] Field of Search ................ 526/283; 525/123, 190, 525/185; 524/554

[56] References Cited

U.S. PATENT DOCUMENTS

| | | | |
|---|---|---|---|
| 2,387,895 | 10/1945 | Gerhart | 260/23 |
| 2,390,530 | 12/1945 | Gerhart | 260/23 |
| 2,392,140 | 1/1946 | Gerhart | 260/22 |
| 2,392,732 | 1/1946 | Gerhart | 260/5 |
| 2,397,600 | 4/1946 | Gerhart et al. | 260/23 |
| 2,397,601 | 4/1946 | Gerhart et al. | 260/23 |
| 2,398,889 | 4/1946 | Gerhart | 260/23 |
| 2,399,179 | 4/1946 | Gerhart | 260/23 |
| 2,404,836 | 7/1946 | Gerhart et al. | 260/42 |
| 2,443,044 | 6/1948 | Lycan et al. | 260/407 |
| 4,100,120 | 7/1978 | Maekawa et al. | 525/7 |
| 4,180,645 | 12/1979 | Emmore et al. | 528/73 |

FOREIGN PATENT DOCUMENTS 93008 12/1987 Romania .

OTHER PUBLICATIONS

C.A. 102:205647 JP60. 13504 1985.
Romanian RO-93008 Jul. 1985.

*Primary Examiner*—Paul R. Michl
*Assistant Examiner*—Peter F. Kulkosky
*Attorney, Agent, or Firm*—Fitch, Even, Tabin & Flannery

[57] ABSTRACT

A copolymer of linseed oil and dicyclopentadiene provides a new polymeric vehicle and formulated coating composition which are low in volatile organic compounds (VOCs), yet provide low viscosities which facilitate application to a substrate with existing equipment.

24 Claims, No Drawings

LINSEED OIL BASED POLYMERIC VEHICLE

This application s directed to a linseed oil copolymer composition, a method of making same and a polymeric vehicle and formulated coating composition which include the linseed oil copolymer composition described herein. More particularly, this application is directed to a copolymer of linseed oil and dicyclopentadiene which provides a new polymeric vehicle and formulated coating composition which are low in volatile organic compounds (VOCs), yet provide low viscosities which facilitate application to a substrate with existing equipment.

BACKGROUND

For about the last fifty years, protective and decorative coatings based upon various polymeric resins have been increasingly used. These polymers have been utilized in many applications because they have provided a wide range of strength, flexibility, toughness, adhesion, degradation resistance and other film properties. Many polymers, however, are in dispersions or are solution polymers because they are prepared and used as a part of dispersions or solutions of polymers in organic solvents. In coatings technology, polymeric vehicles which include thermoplastic polymers require the use of organic solvents which often are toxic and/or subject to regulation that demand their reduction in coating compositions.

Environmental concern has become increasingly important. This concern not only extends to preservation of the environment for its own sake, but extends to safety for the public as to both living and working conditions. VOCs resulting from coating compositions which are applied and used by the industry and by the consuming public are often not only unpleasant, but contribute to photochemical smog. Governments have established regulations setting forth guidelines relating to VOCs which may be released to the atmosphere. The U.S. Environmental Protection Agency (EPA) has established regulations relating to the amount of VOCs released to the atmosphere, such regulations being scheduled for adoption by the states of the United States. Guidelines relating to VOCs, such as those of the EPA, and environmental concerns are particularly pertinent to the paint and industrial coating industry which uses organic solvents which are emitted into the atmosphere.

Polymerization reaction products of linseed oil and dicyclopentadiene as described in U.S. Pat. No. 2,443,044 to Lycan, et al. are known. These products however, are a result of linseed oil which has a low iodine value. Moreover, these prior art products are viscous or are gels and have a high dicyclopentadiene content. When these products are used as a part of polymeric vehicle for a coating binder, a high dicyclopentadiene content interferes with desired or required properties such as hardness, flexibility and impact resistance. Moreover, these prior art linseed oil copolymers resulted in viscous systems which were not suitable for keeping solvent content at a minimum to provide a low VOC formulated coating composition which could be readily applied with existing coating equipment.

In the prior art, there were no restrictions on the amount of solvents used in formulated coatings; hence, large amounts of solvents could have been and were used to bring viscosities of air dried polymeric vehicles and formulated coating compositions to acceptable levels for application to a substrate.

An object of the present invention is to provide a new linseed oil composition which is a copolymer of linseed oil and dicyclopentadiene and a method for making same.

Another object of the invention is to provide a polymeric vehicle which includes the copolymer of linseed oil and dicyclopentadiene and at least one other polymeric resin.

Yet another object of the invention is to provide a low VOC formulated coating composition which includes the polymeric vehicle of the invention.

Still further objects and advantages of the invention will be found by reference to the following description.

SUMMARY OF THE INVENTION

The invention provides a linseed oil copolymer composition which is a copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 30 to about 10 weight percent of the reaction mixture, the linseed copolymer composition having a viscosity in the range of from about 500 to about 10,000 cps at 25° C. The linseed oil copolymer composition has a number average molecular weight in the range of from about 1200 to about 2600.

The polymeric vehicle of the invention comprises a blend of from about 40 to about 90 weight percent of the linseed oil copolymer composition and from about 10 to about 60 weight percent of a second polymer selected from the group consisting of an oil modified urethane polymer and a medium or long oil alkyd polymer. The second polymer has a Gardner-Holt viscosity of about Z or less at about 50% solids at 25° C. When the second polymer is mixed with the linseed oil dicylopentadiene copolymer in a ratio in the range of from about 40:60 to about 90:10 (linseed oil dicyclopentadiene copolymer:second polymer) with a suitable solvent to about 350 grams VOC/liter, the resulting blend has only one phase and is clear and uniform with a viscosity of about 300 cps or less. The polymeric vehicle and formulated coating composition of the invention provide a coating binder having an impact resistance of at least about 160/100 (direct/reverse) and a hardness of at least about B after about one week of drying at ambient temperature when applied to a substrate at a thickness of about 3 mils when wet. The polymeric vehicle will provide coating binder which will have a Sward hardness of at least about 20 in about one week when applied at a thickness of about 3 mils when wet. The polymeric vehicle and the formulated coating composition which include the linseed oil copolymer composition are low in VOCs. The formulated coating composition according to the invention has less than about 2.9 pounds of VOCs per gallon of formulated coating composition.

In a particularly important aspect of the invention, a blend of from about 50 to about 70 weight percent of the linseed oil copolymer and from about 30 to about 50 weight percent of an oil modified urethane polymer having a viscosity of Z or less at 25° C. and having from about 30 to about 60 weight percent solids provides a polymeric vehicle which when mixed with Rule 66 mineral spirits (typically having about 2 or less weight percent aromatics, about 44 weight percent paraffins, about 56 weight percent naphthenes and an initial boiling point of about 323° F. and dry end point of about 381° F.) at level of less than about 2.9 pounds of VOC/-gallon formulated coating has a viscosity in the range of from about 70 to about 300 cps. This formulated coating can be air dried to provide a coating binder having an impact resistance of at least about 160/100 and a hardness of at least about B when applied to a substrate at a thickness of about 3 mils when wet and air dried for not more than about 1 week at an ambient temperature.

DESCRIPTION OF THE PREFERRED EMBODIMENTS

As used in this application, "polymer" means a polymer with repeating same or different monomeric units. "Polymeric vehicle"means all polymeric and resinous components in the formulated coating, i.e., before film formation. The polymeric vehicle may include a cross-linking agent. "Coating binder" means the polymeric part of the film of the coating after solvent has evaporated, and may include cross-linking. "Formulated coating" means the polymeric vehicle and solvents, pigments, catalysts and additives which may optionally be added to impart desirable application characteristics to the formulated coating and desirable properties such as opacity and color to the film. "VOC" means volatile organic compounds and "low VOC" means not more than about 2.9 pounds per gallon or about 350 grams of volatile organic compounds per liter of formulated coating composition. "Volatile organic compounds" are defined by the U.S. Environmental Protection Agency ("EPA") as any organic compound which participates in atmospheric photochemical reactions, except for specific designated compounds which have negligible photochemical activity. Water is not a VOC. The following compounds generally have been designated as VOCS. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylestersulphuric acid, dimethyl-butanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloroethane, trichloroethene, 2,3-dimethylbutane, tetrachloroethane, dimethyl-3-methylenebicycle-heptane, A-pinene, hexachloro-butadiene, methylnaphthalene, naphthalene, quinoline, methylnaphthalene, phenylpropanone, dimethylbenzene, O-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethylbenzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-methylpyridine, pentene, 1-pentane, bromochloropropane, 1H-pyrrole, tetrahydrofuran, hexane, 1,4-dichlorobutane, cyclohexane, cyclohexene, pyridine, octane, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dinethyl-methylene-bicyclo-heptane, 1,2-diethylbenzene, (1-methylpropyl)-benzene, Acetic Acid ethyl-ester, 1,3-diethylbenzene, cyclopentene, heptane, ciw-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethylpentane, decamethylcyclo-pentasil-oxane, 1,3-dichlorobenzene, hexadecane, 2-methylthiophene, 3,3-dimethylpentane, 3-methyl-1-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-di-methylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicycloheptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxaldehyde, benzoyl nitro peroxide, bromochloropropane, dibromo-chloropropane, pentachlorobutadiene, dibromochloropropane, 2-butoxyethanol, bromopentachloroethane, tetradecamethylcycloheptasiloxane, trimethyl-pentanediol, dodecamethylcyclo-hexasil-oxane, hexamethylcyclotrisiloxane, octamethylcyclo-tetrasiloxane, hexadecamethylcyclo-octasil-oxane, tridecane, tetradecane. "Film" is formed by application of the formulated coating to a base or substrate, evaporation of solvent, if present, and cross-linking if a cross-linking resin is present and/or required. "Thermoplastic polymeric vehicle" is a polymeric vehicle which does not require cross-linking to provide a film for a coating binder. "Thermosetting polymeric vehicle" is a polymeric vehicle which requires heat and cross-linking to provide a film for a coating binder.

"Air dried formulated coating composition" means a formulated coating composition that produces a satisfactory film without heating or baking, but which provides a satisfactory film at ambient temperature such as at about 20° C.

As used herein an "isocyanate group" is —N═C═O. As used herein, "diisocyanate" means an isocyanate compound with two isocyanate groups. Polyisocyanate means an isocyanate compound with more than two isocyanate groups. Urethane polymer means a compound which is the reaction product of a di- or polyisocyanate with a compound containing an active hydrogen reactive with an isocyanate group to provide the following linkage

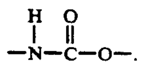

An oil modified urethane polymer is the reaction product of monomers which provide a urethane polymer with an additional oil reactant. The oil reactant comprises from about 50 to about 70 weight percent of all of the monomers reacted to provide the resulting oil modified polyurethane. The oil reactant is any drying or semi-drying oil with an iodine value of greater than 100. In an important aspect of the invention the oil modified polyurethane has a number average molecular weight in the range of from about 3,000 to about 25,000 and preferably from about 5,000 to about 13,000. In a particularly important aspect of the invention the oil modified polyurethane polymer includes the monomers pentaerythrithol, soya oil, toluene diisocyanate and phthalic acid which are reacted to form the oil modified alkyd.

"Dicyclopentadiene" is a dimer of cyclopentadiene, and as commercially available may also contain dimers of cyclic and acyclic monomers of $C_4$ to $C_6$ compounds.

"Linseed oil" means a drying oil which includes triacylglycerols containing primarily linolenic, linoleic, oleic, stearic, palmitic and myristic acids. Generally, more than half of the oil is a derivative of linolenic acid.

A long oil alkyd is an alkyd having from about 57 to about 80 weight percent of drying and semi-drying oils with a iodine value greater than about 100.

A medium oil alkyd is an alkyd having from about 46 to about 56 weight percent of drying and semi-drying oils with a iodine value greater than about 100.

Drying and semi-drying oils used in the invention have a iodine value greater than about 100 and include but are not limited to tung oil, linseed oil, dehydrated caster oil, safflower oil, soya oil, canola oil, rapeseed oil, cottonseed oil and sunflower oil.

The linseed oil copolymer composition is the copolymer reaction product of linseed oil having an iodine value in the range of from about 170 to about 195 and dicyclopentadiene. The reaction mixture which provides the linseed oil copolymer composition comprises from about 70 to about 90 weight percent linseed oil and from about 30 to about 10 weight percent dicyclopentadiene. The copolymer composition has a viscosity in the range of from about 500 to about 10,000 cps at 25° C. and a number average molecular weight in the range of from about 1200 to about 2600. About 50 to about 70 weight percent of the copolymer composition has a molecular weight higher than the linseed oil and from about 0 to about 4 weight percent of the copolymer composition has a molecular weight less than that of linseed oil. The copolymer composition has from about 3.7 to about 4.8 acyl chain double bonds compared to approximately about 6.3 acyl chain double bonds in linseed oil, and about 25 to about 90 percent of the acyl chains of the oil are cross-linked.

The linseed oil dicyclopentadiene copolymer composition is made by charging the linseed oil into a closed reactor purged with an inert gas such as nitrogen. The oil is heated to about 260° C. with constant stirring which is continued throughout the reaction with dicyclopentadiene. Dicyclopentadiene is added at a slow rate (from about 0.4 volume percent to about 0.9 volume percent per minute of the total dicyclopentadiene to be added) under the surface of the linseed oil in the reactor where it is heated. While not intending to be bound by any theory, it is believed that as the dicyclopentadiene enters the vessel the dicyclopentadiene dedimerizes into two molecules of cyclopentadiene and reacts with the linseed oil double bonds. The linseed oil copolymer produced by reacting linseed oil with a low concentration of cyclopentadiene produces a copolymer with a viscosity which permits a low VOC coating composition and minimizes the formation of cyclopentadiene oligomers which may have a deleterious effect on the film performance of a coating binder. After the addition of the dicyclopentadiene, the heating of the reaction mixture is continued at a temperature of not more than about 300° C., and preferably in a temperature range of from about 230° C. to about 275° C. for about 1 hour to about 48 hours. The reaction is permitted to proceed until a desired viscosity is reached such as from about 500 to about 10,000 cps at 25° C. Thereafter the copolymer reaction product is cooled and removed from the reaction vessel. Optionally, the volatile components left in the reaction vessel may be removed by applying a vacuum such as about less than 50 mm Hg during about the last 30 minutes of the reaction.

In an important aspect of the invention, the reaction mixture comprises from about 75 to about 80 weight percent linseed oil having an iodine value in the range of from about 175 to about 190 and from about 20 to about 25 weight percent dicyclopentadiene. The resulting composition from the copolymerization of linseed oil and dicyclopentadiene has a viscosity in the range of from about 3,000 to about 7,500 cps at 25° C.

The polymeric vehicle of the invention comprises a blend of from about 40 to about 90 weight percent, based upon the total weight of the polymeric vehicle, linseed oil dicyclopentadiene copolymer with from about 10 to about 60 weight percent of a second polymer. The second polymer is selected from the group consisting of an oil modified polyurethane, and a medium or long oil alkyd polymer. The second polymer has a Gardner-Holt viscosity of about Z or less at 50% solids at 25° C. When the second polymer is mixed with the linseed oil dicyclopentadiene copolymer in the ratio in the range of about 40:60 to about 90:10 (linseed oil dicyclopentadiene copolymer: second polymer), and blended with a suitable solvent to about 350 grams VOC/liter, the resulting formulated coating composition is a clear and uniform blend with a viscosity of 300 cps or less. In an important aspect, the second polymer has a solids level in the range of from about 30 to about 60 weight percent.

In an especially important aspect of the invention the polymeric vehicle provides an air dried formulated coating composition when the copolymer of linseed oil is combined with an oil modified polyurethane in a ratio in the range of from about 50/50 to about 70/30 linseed oil copolymer to the second copolymer. In this important aspect where the second polymer in the polymeric vehicle is an oil modified polyurethane, the linseed oil copolymer is the product of polymerization and reaction comprising from about 75 to about 80 weight percent linseed oil having an iodine value in the range of from about 175 to about 190 and from about 20 to about 25 percent dicyclopentadiene. In this aspect the linseed oil copolymer has a viscosity in the range from about 3,000 to about 7,500 cps at 25° C.

The formulated coating composition of the invention includes the polymeric vehicle, pigments, solvents, driers, coalescents and other additives which will provide a suitable coating binder. The formulated coating composition will have solids in the range of from about 50 to about 75 weight percent and less than about 2.9 pounds of VOCs/gallon of formulated coating composition. Preferably the formulated coating composition will have a viscosity in the range of from about 70 to about 300 cps at 25° C. Any hydrocarbon solvent may be suitable for the formulated coating composition. Solvents which may be used to make the formulated coating composition include mineral spirits, naphthas, xylenes, toluenes, trimethyl benzenes, ethyl toluenes and ethyl benzenes and mixtures thereof. The combination of the of linseed oil copolymer and oil modified polyurethane when blended with the previously described solvents and especially Rule 66 mineral spirits provides a formulated coating composition which is an important aspect of the invention. This formulated coating composition is a low VOC composition which may be air dried at not greater than 40° C. to provide a coating binder having a pencil hardness of at least about 4B (ASTM Test D3363-74) in about 48 hours, dry through (ASTM Test D1640) in not more than about 3.5 hours, an impact resistance of at least about 160/100 (direct/reverse) in about 1 week and a Sward hardness of at least 20 (ASTM Test D2134-66) in about 1 week, when applied to a substrate at a thickness of about 3 mils when wet.

The following examples set forth exemplary methods of making the copolymer of linseed oil, the polymeric vehicle and formulated coating composition according to the invention.

EXAMPLE I

A. Preparation Of The Copolymer Of Linseed Oil And Dicyclopentadiene

Linseed oil (LSO) 310 g (75 wt %) is charged into a closed reactor and purged with nitrogen for a few minutes. The oil is heated to about 260° C. with constant stirring. The stirring is continued throughout the reaction. Dicyclopentadiene 104 ml (25 wt %) is added at a slow addition rate of 0.4 to 0.6 ml/min at the bottom of the vessel under the hot LSO. Dicyclopentadiene is commercially available as 97 RM from Exxon Chemical, Houston, TX 77253-3272.

After the addition of DCPD is complete the reaction mixture is kept at 260° C. for 3.5 hours more with stirring. Then the mixture is stripped at 1 mm Hg for 30 minutes and removed from the reaction vessel. Thereafter, the product is cooled and the final product viscosity is 7,100 cps.

B. Preparation of Formulated Coating Composition

The product of Example IA is formulated with an oil modified polyurethane commercially available as Resin 4355 from Cargill Incorporated, Minneapolis, Minn., the formulated coating composition comprising 60 weight percent copolymer of linseed oil and 40 weight percent of oil modified polyurethane, based upon the total weight of oil modified polyurethane and copolymer of linseed oil. The latter ingredients are blended with Rule 66 mineral spirits and driers such as 6% Calcium Cem-all, 12% Cobalt Cem-all, 12% Zirconium Cem-all (from Mooney Chemicals, Cleveland, Ohio), Activ-8 (from R. T. Vanderbilt, Norwalk, Conn.) and Exkin #2 (from Huls America, Puscatway, N.J.) (comprising about 0.5 weight percent based upon the weight of total resin solids) to provide a formulated coating composition having about 342 g/liter VOCS, a density of 7.65 lbs./gal., and 62.6% solids (ASTM Test D2389-81). Upon application to a substrate, at a thickness of about 3 mils when wet, the formulated coating composition provided a film with the following characteristics.

| | |
|---|---|
| Tack Free | 4.25 hours |
| Set to Touch | 10 minutes |
| Surface Dry | 1.50 hours |
| Dry Through | 2.00 hours |
| Print Free | 3.00 hours |
| Pencil Hardness | 3B in 24 hours;<br>2B in 48 hours;<br>B in one week; and<br>HB in two weeks |
| Sward Hardness | 10 in 24 hours;<br>14 in 48 hours;<br>26 in one week; and<br>36 in two weeks |
| Flexibility | ⅛" mandrel bend test passed |
| Impact | 160/160 (direct/reverse) |

The physical properties and the drying characteristics of the formulated coatings prepared as described in Example I (with low VOC) are compared with the commercial high VOC containing oil modified polyurethane and are shown in Table I below.

TABLE I

| | Linseed Oil Modified Formulated Coating | Oil Modified Polyurethane Commercial Resin |
|---|---|---|
| VOC (g/lit) | 342 | 466 |
| Solids (wt. %) | 62.2 | 47.7 |
| Viscosity (cp) | 120 | 140 |
| Density (lbs./gal.) | 7.63 | 7.65 |
| Tack Free (hrs.) | 4.25 | 2.5 |
| Set to Touch (min.) | 10 | 10 |
| Surface Dry (hrs.) | 1.5 | 0.5 |
| Dry Through (hrs.) | 2.0 | 1.0 |
| Print Free (hrs.) | 3.0 | 1.25 |
| Pencil Hardness | | |
| 48 hrs. | 2B | B |
| 1 week | B | HB |
| Sward Hardness | | |
| 48 hrs. | 14 | 17 |
| 1 week | 26 | 42 |
| Flexability | ⅛" Mandrel Bend Passed | ⅛" Mandrel Bend Passed |
| Impact | 160/160 | 160/160 |

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A composition which is the copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 10 to about 30 weight percent of the reaction mixture, the composition having a viscosity in the range of from about 500 to about 10,000 cps at 25° C.

and wherein the reaction mixture is provided by addition of the dicyclopentadiene to the linseed oil at a rate of from about 0.4 to about 0.9 volume percent per minute of the total dicyclopentadiene added to the linseed oil, the reaction mixture being heated at a temperature of not more than 300° C. in a closed container.

2. The composition as recited in claim 1 wherein the composition has a number average molecular weight in the range of from about 1200 to about 2600.

3. The composition as recited in claim 1 wherein about 50 to about 70 percent of the composition has a higher molecular weight than the linseed oil.

4. The composition as recited in claim 2 wherein from about 25 percent to about 90 percent of the linseed oil acyl chains are cross-linked.

5. The composition as recited in claim 1 wherein the reaction mixture comprises from about 75 to about 80 weight percent linseed oil having an iodine value in the range of from about 175 to about 190 and from about 20 to about 25 weight percent dicyclopentadiene, the composition having a viscosity in the range of from about 3,000 to about 7,500 cps at 25° C.

6. A polymeric vehicle capable of being air dried which polymeric vehicle provides a coating binder having an impact resistance of at least about 160/100 (direct/reverse) and a Sward hardness of at least about 20 in about 1 week when applied to a substrate at a thickness of about 3 mils wet, the polymeric vehicle comprising a mixture of linseed oil copolymer and a second polymer in a ratio in the range of from about 40/60 to about 90/10 linseed oil copolymer to second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 30 to about 10 weight percent of the reaction mixture, the linseed oil copolymer having a viscosity in the range of from about 500 to about 10,000 cps at 25° C., the second polymer selected from the group consisting of an oil modified urethane polymer and an alkyd polymer, the second polymer a viscosity of Z or less at 50 percent solids at 25° C. wherein the reaction mixture is provided by the addition of the dicyclopentadiene to the linseed oil at the rate of from about 0.4 to about 0.9 volume per cent per minute of the total dicyclopentadiene added to the linseed oil, the mixture being heated at a temperature of not more than 300° C. in a closed container.

7. A polymeric vehicle as recited in claim 6 wherein the second polymer has a solids level in the range of from about 30 to about 60 weight percent.

8. The polymeric vehicle as recited in claim 6 wherein the polymeric vehicle provides the coating binder having a pencil hardness of at least about 4B by air drying in not more than 48 hours at a temperature of not more than about 40° C.

9. The polymeric vehicle of claim 6 wherein the second polymer is an oil modified polyurethane polymer having a number average molecular weight in the range of from about 3,000 to about 25,000, the linseed is the copolymerization reaction product of from about 70 to about 90 weight percent linseed oil having an iodine value in the range of from about 170 to about 195 and from about 30 to about 10 weight percent dicyclopentadiener and wherein the linseed has a viscosity in the range of from about 500 to about 10,000 cps at 25° C.

10. The polymeric vehicle of claim 7 wherein the second polymer is an oil modified polyurethane polymer having a number average molecular weight in the range of from about 3,000 to about 25,000, the linseed oil copolymer is copolymerization reaction product of from about 75 to about 80 weight percent linseed oil having an iodine value in the range of from about 175 to about 190 and from about 20 to about 25 weight percent dicyclopentadiene, and wherein the modified linseed oil has a viscosity in the range of from about 3,000 to about 7,500 at 25° C.

11. A formulated coating composition which has less than about 2.9 pounds of volatile organic compounds per gallon of the formulated coating composition and which formulated coating composition will provide a coating binder having a pencil hardness of at least about B and an impact resistance of at least about 160/100 (direct/reverse) after application to a substrate at a thickness of about 3 mils wet and drying at ambient temperature for about one week, the formulated coating composition comprising a polymeric vehicle which comprises a mixture of linseed oil copolymer and second polymer in a ratio in the range of from about 40/60 to about 90/10 linseed oil copolymer to second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 30 to about 10 weight percent of the reaction mixture, and wherein the reaction mixture is provided by addition of the dicyclopentadiene to the linseed oil at a rate of from about 0.4 to about 0.9 volume percent per minute of the total dicyclopentadiene added to the linseed oil, the reaction mixture being heated at a temperature of not more than 300° C. in a closed container, the oil copolymer having a viscosity in the range of from about 500 to about 10,000 cps at 25° C., the second polymer selected from the group consisting of a urethane polymer and an oil modified alkyd polymer, the second polymer having a viscosity of Z or less at 50 percent solids at 25° C.

12. The formulated coating composition as recited in claim 11 wherein the linseed oil copolymer has a number average molecular weight in the from about 1200 to about 2600.

13. A formulated coating composition as recited in claim 12 wherein the second polymer has a solids level in the range of from about 30 to about 60 weight percent.

14. The formulated coating composition as recited in claim 11 wherein the second polymer is an oil modified polyurethane having a number average molecular weight in the range of from about 3,000 to about 25,000, the linseed oil copolymer is the copolymerization reaction product of from about 75 to about 80 weight percent linseed oil Having an iodine value in the range of from about 175 to about 190 and from about 20 to about 25 weight percent dicyclopentadiene, and wherein the linseed oil copolymer has a viscosity in the range of from about 3,000 to about 7,500 cps at 25° C.

15. A method for making a copolymer of linseed oil and dicyclopentadiene, the method comprising mixing linseed oil and dicyclopentadiene method by adding dicyclopentadiene to the linseed oil under nitrogen, the linseed oil having a iodine value in the range of from about 170 to about 195, the dicyclopentadiene being added the linseed oil at a rate of from about 0.4 volume % to about 0.9 volume percent per minute of the total dicyclopentadiene to be added at a temperature of not greater than about 300° C., the linseed oil comprising from about 70 to about 90 weight percent of the linseed oil and dicyclopentadiene mixture and the dicyclopentadiene comprising from about 30 to about 10 weight percent of the linseed oil and dicyclopentadiene mixture, the copolymer having a viscosity in the range of from about 500 to about 10,000 cps at 25° C.

16. A composition which when combined with a second polymer is effective for providing a polymeric vehicle which polymeric vehicle will provide a formulated coating composition having not more than about 2.9 pounds per gallon volatile organic compounds and which polymeric vehicle will provide a coating binder having a pencil hardness of at least about B and an impact resistance of at least about 160/100 (direct-/reverse) after application to a substrate at a thickness of about 3 mils wet and drying at ambient temperature for about one week, the composition comprising a copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 10 to about 30 weight percent of the reaction mixture, the composition having a viscosity in the range of from about 500 to about 10,000 cps at 25° C., the reaction mixture being provided by the addition of the dicyclopentadiene to the linseed oil at a rate of from about 0.4 to about 0.9 volume percent per minute of the total dicyclopentadiene added to the linseed oil and the reaction mixture being heated at a temperature of not more than 300° C. in a closed container.

17. The composition as recited in claim 16 wherein the composition has a number average molecular weight in the range of from about 1200 to about 2600.

18. The composition as recited in claim 16 wherein about 50 to about 70 percent of the composition has a higher molecular weight than the linseed oil.

19. The composition as recited in claim 176 wherein from about 25 percent to about 90 percent of the linseed oil acyl chains are cross-linked.

20. The composition as recited in claim 16 wherein the reaction mixture comprises from about 75 to about 80 weight percent linseed oil having an iodine value in the range of from about 175 to about 190 and from about 20 to about 25 weight percent dicyclopentadiene, the composition having a viscosity in the range of from about 3,000 to about 7,500 cps at 25° C.

21. A polymeric vehicle capable of being air dried which polymer vehicle provides a coating binder having an impact resistance of at least about 160/100 (direct/reverse) and a Sward hardness of at least about 20 in about 1 week when applied to a substrate at a thickness of about 3 mils wet, the polymeric vehicle comprising a mixture of linseed oil copolymer and a second polymer in a ratio in the range of from about 40/60 to about 90/10 linseed oil copolymer to second polymer, the linseed oil copolymer comprising the copolymerization reaction product of a reaction mixture comprising linseed oil having an iodine value in the range of from about 170 to about 195 and dicyclopentadiene, the linseed oil comprising from about 70 to about 90 weight percent of the reaction mixture and the dicyclopentadiene comprising from about 30 to about 10 weight percent of the reaction mixture, the reaction mixture being provided by the addition of the dicyclopentadiene to the linseed oil at a rate of from about 0.4 to about 0.9 volume percent per minute of the total dicyclopentadiene added to the linseed oil, the linseed oil copolymer having a viscosity in the range of from about 500 to about 10,000 cps at 25° C., the second polymer selected from the group consisting of an oil modified urethane polymer and an alkyd polymer, the second polymer having a viscosity of Z or less at 50 percent solids at 25° C., the oil modified urethane polymer being the reaction product of monomers which will provide a urethane polymer and a drying oil having an iodine value of greater than about 100.

22. A polymeric vehicle as recited in claim 21 wherein the second polymer is the oil modified urethane polymer and the drying oil is selected from the group consisting of tung oil, linseed oil, dehydrated caster oil, safflower oil, soya oil, canola oil, rapeseed oil, cottonseed oil, sunflower oil and mixtures thereof.

23. A polymeric vehicle as recited in claim 21 wherein the second polymer is the alkyd polymer which comprises from about 46 to about 80 weight percent of a drying oil having an iodine value greater than about 100.

24. A polymeric vehicle as recited in claim 23 wherein the drying oil is selected from the group consisting of tung oil, linseed oil, dehydrated caster oil, safflower oil, soya oil, canola oil, rapeseed oil, cottonseed oil, sunflower oil and mixtures thereof.

* * * * *

UNITED STATES PATENT AND TRADEMARK OFFICE
CERTIFICATE OF CORRECTION

PATENT NO. : 5,288,805

DATED : February 22, 1994

INVENTOR(S) : Kodali, Dharma R.

It is certified that error appears in the above-identified patent and that said Letters Patent is hereby corrected as shown below:

Column 9, line 47, change "per cent" to --percent--.

Column 9, line 62, change after "linseed" insert --oil copolymer--.

Column 9, lines 66-67, change "dicyclopentadiener," to --dicyclopentadiene,--.

Column 9, line 67, after "linseed" insert --oil copolymer--.

Column 10, line 5, after "is" insert --the--.

Column 10, line 9, after "wherein the" delete "modified" and after "oil" insert -copolymer--.

Column 10, line 58, change "Having" to --having--.

Column 11, line 43, change "176" to --17--.

Column 12, line 4, change "polymer" to --polymeric--.

Signed and Sealed this

Twenty-first Day of February, 1995

Attest:

BRUCE LEHMAN

*Attesting Officer*

*Commissioner of Patents and Trademarks*